Dec. 14, 1937.  J. R. SALZMAN ET AL  2,102,095
AIRPLANE
Filed April 20, 1936  6 Sheets-Sheet 1

INVENTORS
Joseph R. Salzman,
Carl J. Snyder,
BY
ATTORNEYS

Dec. 14, 1937.    J. R. SALZMAN ET AL    2,102,095
AIRPLANE
Filed April 20, 1936    6 Sheets-Sheet 2
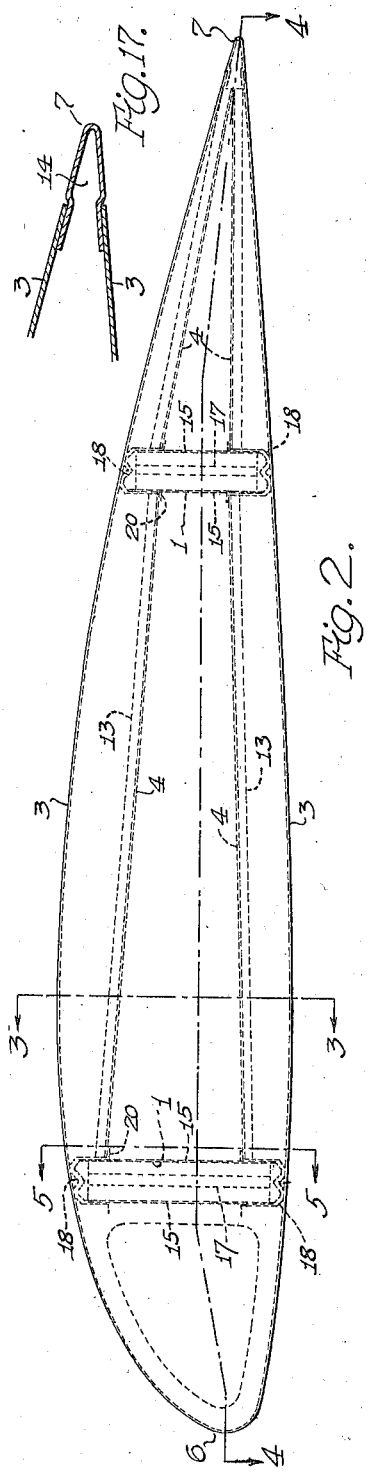
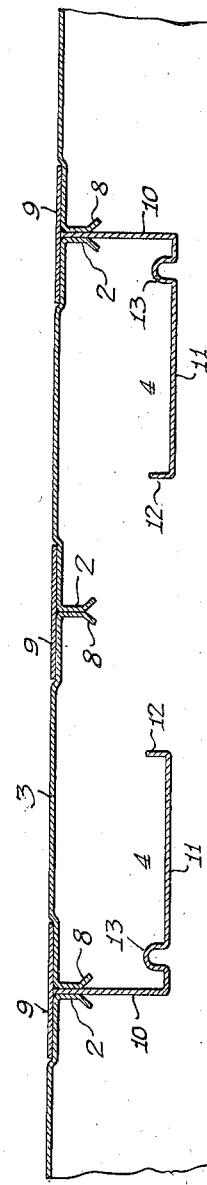
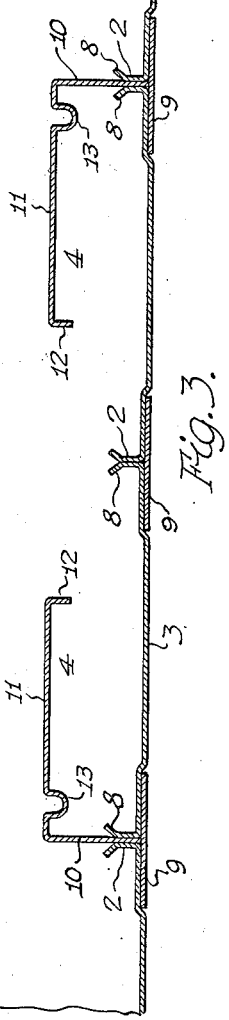
INVENTORS
Joseph R. Salzman,
Carl J. Snyder,
BY
ATTORNEYS

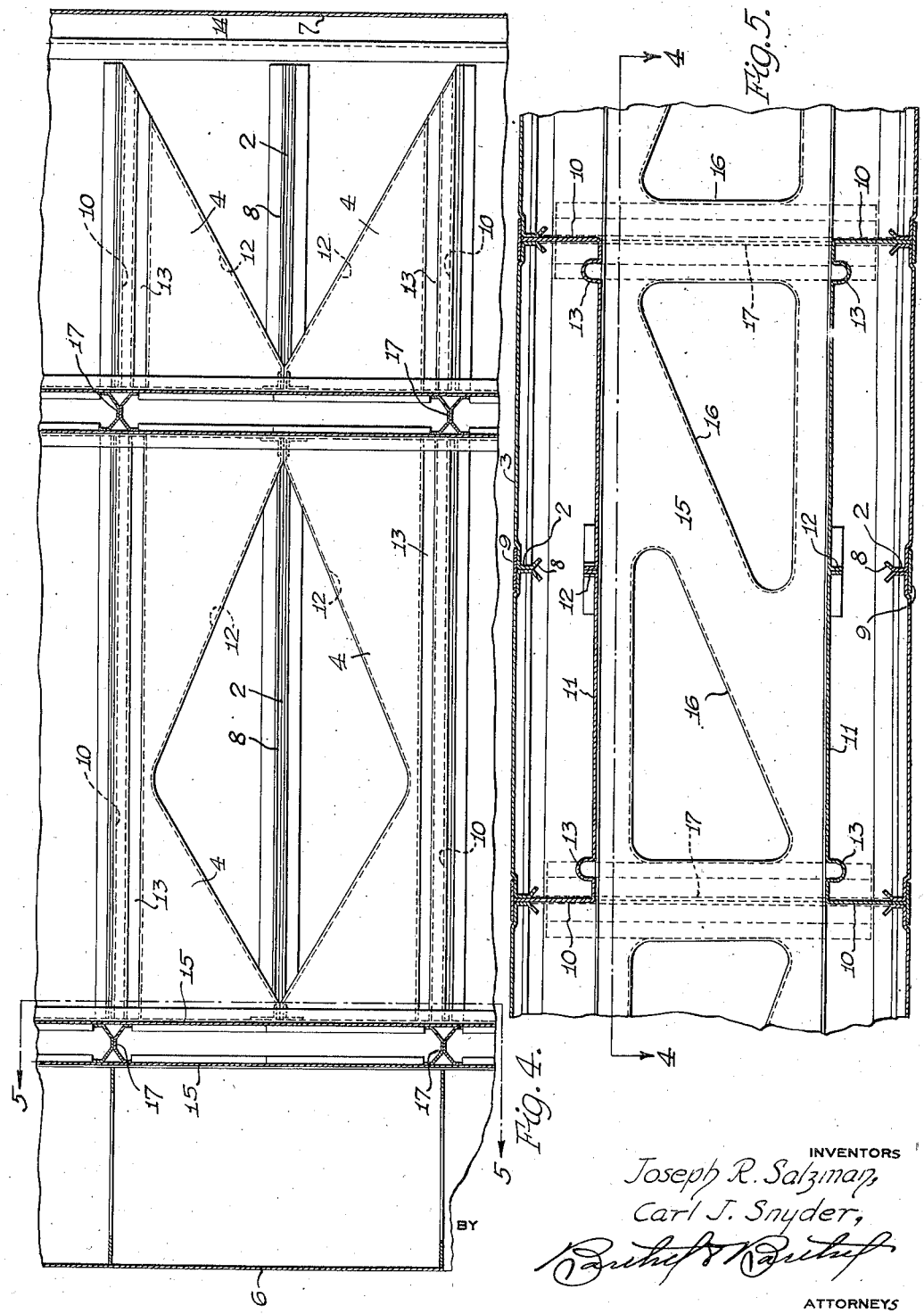

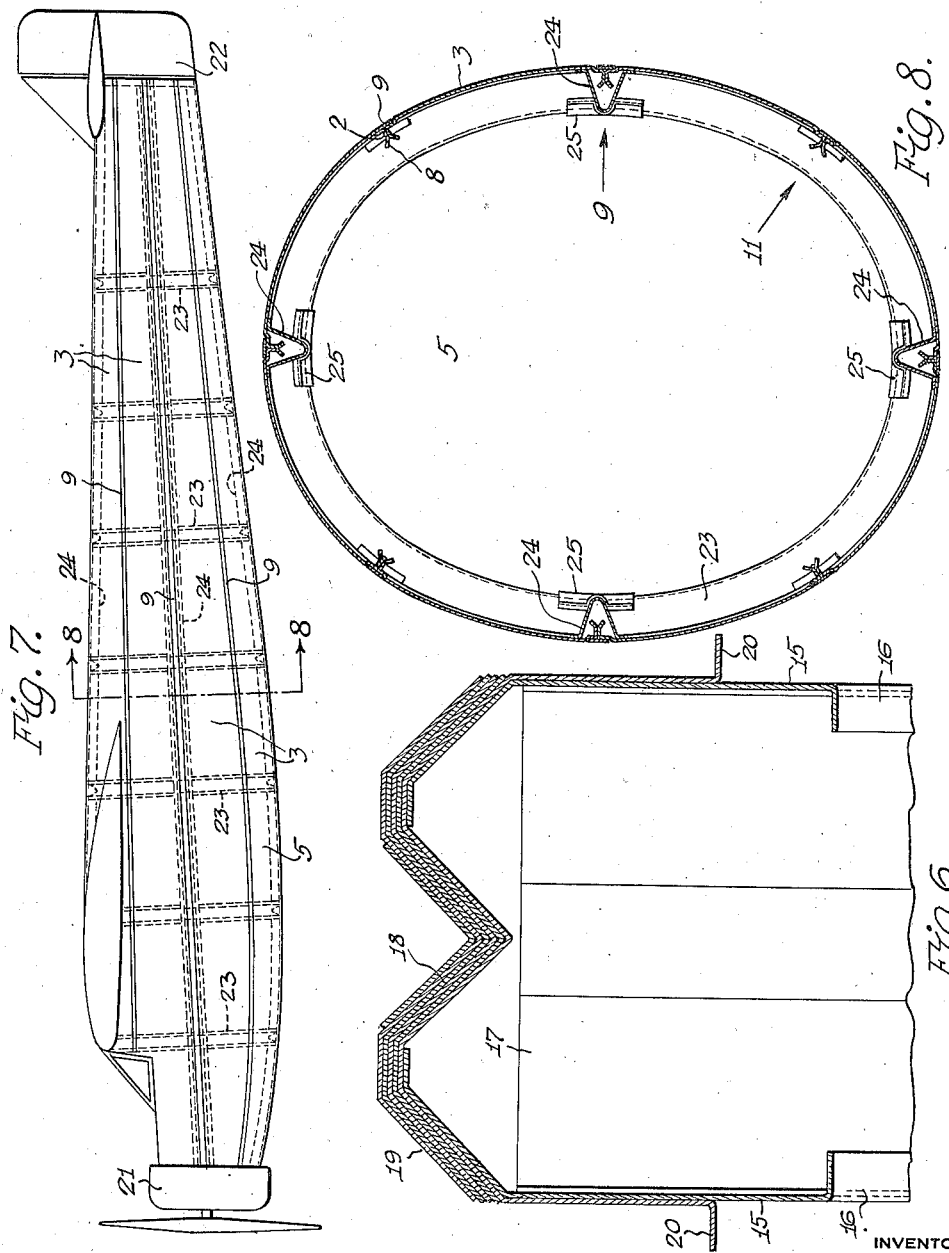

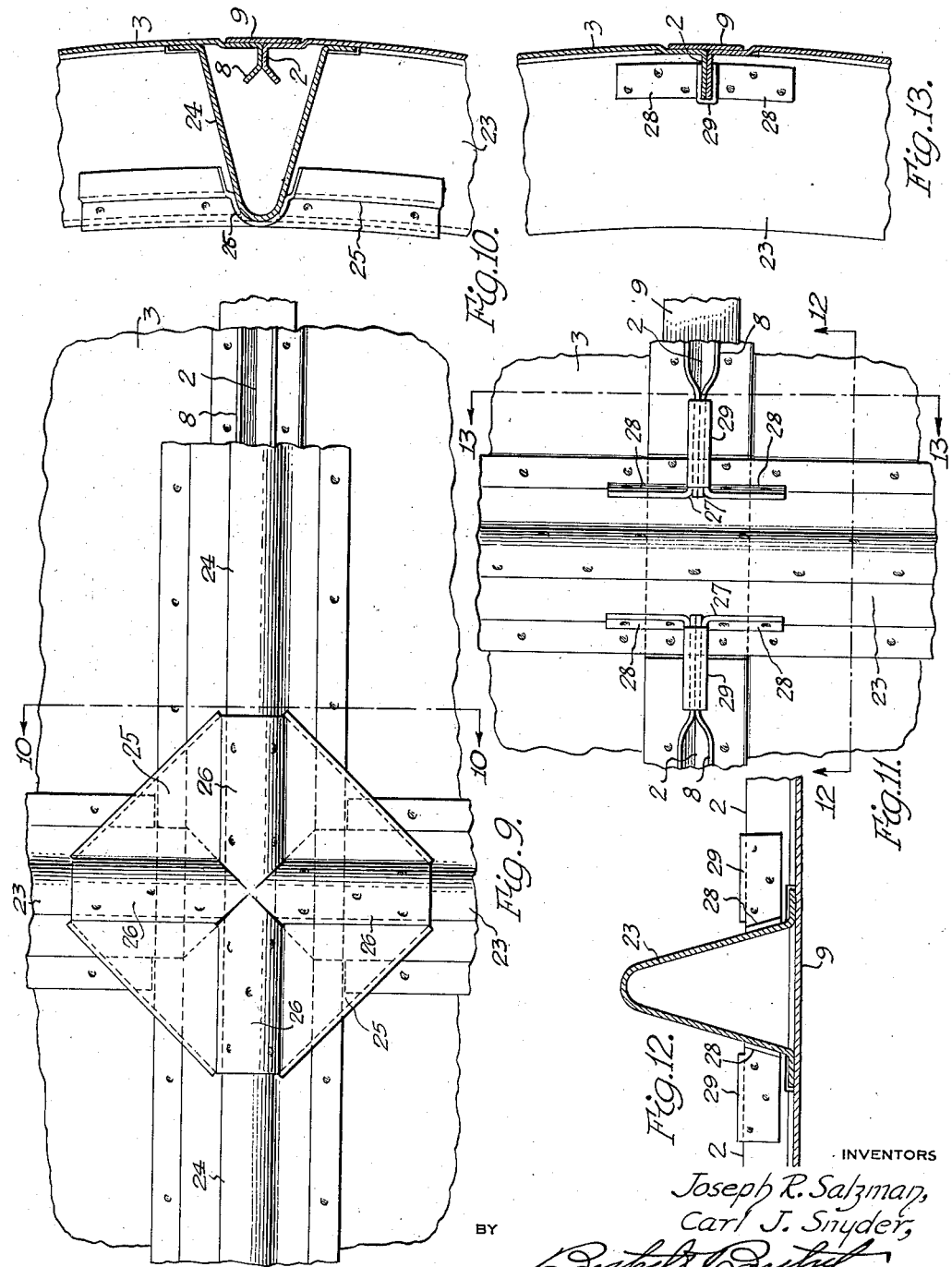

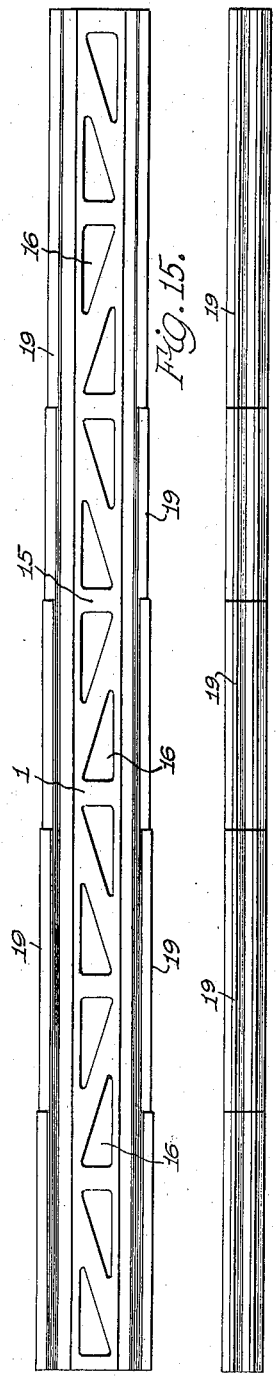
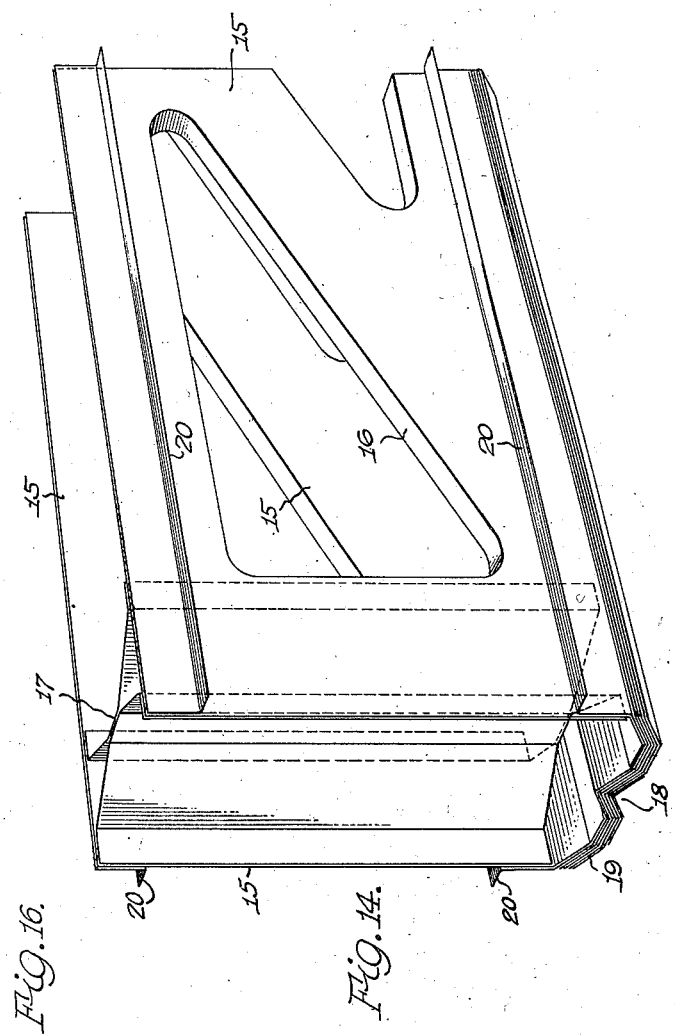

Patented Dec. 14, 1937

2,102,095

UNITED STATES PATENT OFFICE 2,102,095

AIRPLANE

Joseph R. Salzman and Carl J. Snyder, Detroit, Mich.

Application April 20, 1936, Serial No. 75,350

7 Claims. (Cl. 244—123)

This invention relates to airplane constructions and more particularly to the fabrication of fuselage and wings.

An object of the present invention is to provide a construction and arrangement of parts whereby these parts may be formed of thin sheet steel without increase in weight over known constructions or sacrifice in strength, the fabrication and arrangement of parts being such as to greatly reduce the cost of manufacture, give great strength and rigidity, and yet provide a structure which, as a whole, is of minimum weight.

A further object is to form an airfoil with sheet metal reinforcing strips extending parallel with the longitudinal axis of the strip and having formed edges for added strength and bracing, thus dispensing with the necessity for the conventional form of ribs; and to provide a self ribbed skin, which, when assembled with said reinforcing strips, forms a covering, every joint of which is a T-section of double thickness of metal to provide great strength and rigidity without materially increasing the weight.

It is also an object to so form certain members of sheet steel as to adapt them to serve as combined drag, anti-drag and compressing members, their form being such as to adapt one leg or flange thereof to be secured within a seam of the skin, and another leg or flange to serve as a brace between front and rear spars, the first named leg thus serving as a compression rib and the second as drag and anti-drag bracing.

It is also an object to provide an improved spar construction of laminated sheet metal construction and longitudinally tapered form, wherein the maximum of strength and minimum of weight is secured; and to provide a fuselage of semi-monocoque form having longérons, bulkhead rings and our special reinforced skin, making every section of very strong and rigid box like sheet metal construction.

Further objects are to provide certain other new and useful features in the construction, arrangement and combination of elements, all as hereinafter set forth and more particularly pointed out in the appended claims, reference being had to the accompanying drawings in which:

Fig. 2 is an enlarged end view of the same;

Fig. 3 is a further enlarged sectional detail substantially upon the line 3—3 of Fig. 2;

Fig. 4 is a sectional detail substantially upon the line 4—4 of Figs. 5 and 2;

Fig. 5 is a transverse sectional detail substantially upon the line 5—5 of Figs. 3, 4 and 2;

Fig. 6 is an enlarged transverse sectional detail of a spar, the lower part of which is shown in perspective in Fig. 14;

Fig. 7 is a side elevation of a complete airplane embodying the present invention;

Fig. 8 is an enlarged transverse section of the fuselage substantially upon the line 8—8 of Fig. 7;

Fig. 9 is an enlarged detail plan view of a portion of the interior of the fuselage looking in the direction of the arrow 9 in Fig. 8;

Fig. 10 is a section substantially upon the line 10—10 of Fig. 9;

Fig. 11 is a detail view similar to Fig. 9 and looking in the direction of the arrow 11 in Fig. 8;

Fig. 12 is a section substantially upon the line 12—12 of Fig. 11;

Fig. 13 is a section substantially upon the line 13—13 of Fig. 11;

Fig. 14 is a perspective detail of a spar with the upper part thereon in section;

Fig. 15 is a side elevation of a tapered end portion of the spar drawn to a reduced scale;

Fig. 16 is an edge view of Fig. 15; and

Fig. 17 is a sectional detail of the trailing edge of the wing.

Figure 1:
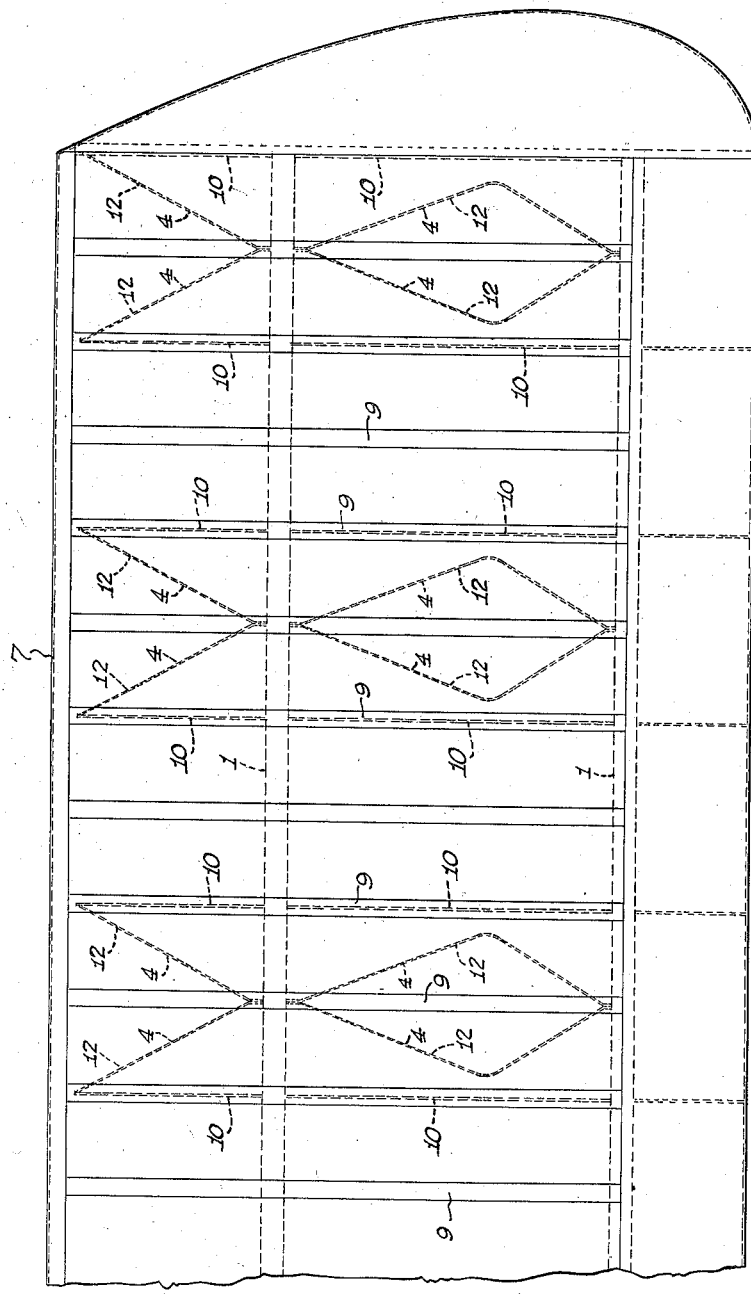
Figure 1 is a plan view of an end portion of a wing illustrative of an embodiment of features of the present invention.

Referring more particularly to Figs. 1 to 4 inclusive, the wing or airfoil construction embodying the present invention, comprises the major members, to wit, the spars indicated as a whole by the numeral 1, the ribs whose duty it is to carry the skin and hold it in proper airfoil section contour, these ribs being each indicated as a unit by the numeral 2, the skin 3 or covering forming the external surface of the wing, and the combined compression ribs and drag members, indicated as a whole by the numeral 4.

The spars, the detailed construction of each of which is hereinafter more fully set forth, extend throughout the length of the airfoil and through the upper part of the fuselage, indicated as a whole by the numeral 5, in the usual relative positions, one being located just rearwardly of the nose 6 of the airfoil, and the other, a considerable distance forwardly of the trailing edge 7. The skin 3 is preferably made up of a plurality of strips of thin sheet steel of the desired number and width, extending in parallel relation from nose to trailing edge with their edges turned inwardly to form inwardly extending flanges with adjacent flanges spot welded or otherwise firmly secured together to form the skin ribs 2 for strengthening and maintaining the proper upper and lower face contour of the airfoil. To further strengthen and stiffen these ribs which are an integral part of the skin, the inner or free edge portions of these flanges which form the ribs, are bent laterally away from each other at an angle, as at 8, and to strengthen the meeting joints or seams between the several strips forming the skin, the skin is depressed slightly along each seam and within each of these depressions is laid a uniting strip 9 overlying each seam and of a width to extend some distance each side of the seam so that each strip may be firmly spot welded to the skin along each side of the seam within the depression which is of a depth equal to the thickness of the uniting strip to give a flush outer skin surface. The skin is thus of double thickness throughout the length of each seam to aid in maintaining airfoil contour and add strength at line of connection of ribs to skin.

To take the place of the usual comparatively heavy and expensive compression members which extend between the spars to support the skin and also the drag and anti-drag bracing which is usually complicated and expensive to build, these elements are combined in the members 4 which are each formed from a single strip of thin sheet metal bent to provide a member of L-form in cross section, the vertical leg or wall 10 being adapted to take compressive force upon the skin, and the horizontal leg or portion 11 which extends laterally from the inner edge of compression rib 10, is adapted to take the drag and anti-drag strains imposed upon the spars, the outer edge of each rib 10 being secured, by spot welding or otherwise, between the inturned flanges of certain of the skin ribs 2, as preferably between these flanges of every second rib, and both portions 10 and 11 being rigidly secured at the ends of the combined member 4 to the spars 1. The drag braces 11 may each be narrowed at an angle to its rib 10, to a point intermediate its ends, as clearly shown in Fig. 4 for the purpose of lightness and to form diagonal bracing for the spars, and the free edge of each diagonal brace portion is preferably turned at a right angle to the main portion or wall of said brace 11 as at 12, to add strength and rigidity to said brace and said wall may also be formed up into a hollow rib 13 extending parallel with and adjacent to its juncture with the compression rib or wall 10.

The nose 6 of the airfoil comprises the usual internal brace members or framing rigidly secured to the forward spar and of the desired contour, this framing being covered by a thin sheet metal skin of one piece construction firmly secured to the nose framing to conform to the contour thereof, and the trailing edge of the airfoil is formed by a thin metal strip bent longitudinally into V-formation as shown at 14, with the edges of the strip inserted between the rear edges of the skin and spot welded in place, thus forming a smooth rounded trailing edge as shown in Fig. 17.

Each of the spars 1 is substantially rectangular in cross section and of hollow box-like construction, being formed entirely of thin sheet steel strips assembled and spot welded together to give the desired cross-sectional contour, the strips forming the side walls 15 being, for the purpose of lightness in weight, formed with suitably arranged openings 16, the edges of the metal around each opening being flanged inwardly to add strength to the spar. Suitable transverse braces 17 are arranged at intervals between these side walls to brace and strengthen these walls, each of these braces comprising two strips of sheet steel spot welded together along their longitudinal central portion with the edge portions bent laterally and the extreme edge portions abutting the walls 15 and spot welded thereto, each brace thus having, in cross section, the form of an X.

To increase the strength and rigidity against bending, both the top and bottom walls 18 of each spar are formed of a plurality of thicknesses or strips 19 of sheet steel laid one upon the other as shown in Figs. 6 and 14, and these strips are of different lengths as indicated in Figs. 15 and 16 to gradually taper each wall in thickness from its central portion where greatest strength is required, toward each end of the spar. These walls 18 may be shaped in cross section as desired, but preferably with inclined side edge portions and a central longitudinally extending, inwardly depressed V-shaped groove, as shown. The first strip laid upon the inturned portions of the side walls 15 to form the laminated walls 18, is extended upon these side walls for a distance and then flanged or bent outwardly as at 20 to form ledges for supporting the ends of the drag braces 11 and provide places of attachment for the ends of the members 4 to the spars 1.

The fuselage 5 is of semi-monocoque construction, and the skin 3 thereof is formed of a plurality of sheet steel strips extending longitudinally of said fuselage with the adjacent edge portions of these strips inturned the same as the wing skin, to form the several skin ribs 2, the seams uniting the several strips being covered by the uniting strips 9 extending longitudinally from the front end or motor chamber 21 to the rear or tail end to which the empennage 22 is attached. To support and hold the skin to its proper contour and provide a very strong and rigid fuselage, bulkhead rings 23 are provided at intervals throughout the length of the fuselage and longérons 24 extend the length of the fuselage, crossing these rings at right angles. These rings and longérons are both formed from strip steel bent longitudinally into substantially U-shape in cross section with their laterally flanged edges spot welded to the skin 3, the longérons being placed opposite certain of the seams of the skin and enclosing the ribs 2 of those seams.

Where these bulkhead rings and longérons cross each other, they are firmly united by a crossing or gusset plate 25 as shown in Figs. 9 and 10, this plate being of substantially rectangular form in plan view and formed with deep channels extending from corner to corner of the plate and crossing at the center thereof, these channels 26 being of a form in cross section, to fit over and receive the curved bottom or inner sides of the U-shaped rings and longérons to which said plate channels are spot welded, the portions of the plate between these channel portions, forming gussets extending across the angles between said ring and longéron to firmly connect and brace the same at the point of crossing.

Where the rings cross the intermediate skin ribs 2, these rings are rigidly secured to said ribs by sleeve brackets 27 each formed with laterally extending end flanges 28 spot welded to the side of the ring 23 and with a channel portion 29 to receive and fit closely over the two flanges forming the rib, which flanges are bent into face contact adjacent the ring to be received within the channel 29.

Very strong and rigid braced connections are thus provided between bulkhead rings, longérons and ribs and as these connecting members, as well as the members connected thereby, are all formed of sheet steel, a very strong structure of minimum weight is secured, and as the skin of both fuselage and airfoil is formed with integral ribs extending parallel with the fore and aft axis of the airplane, and as the joints between the several strips forming this skin are also reinforced by the exterior uniting strips 9, a very rigid skin structure is secured having high resistance to deformation, yet is of minimum weight.

Obviously changes in the shape or contour of both wing and fuselage structures may be made as well as in other elements of the structure, without departing from the spirit of the present invention, and such changes are contemplated.

Having thus fully described our invention what we claim is:

1. In an airplane, an airfoil including a skin formed of a plurality of sheet metal strips extending longitudinally of the longitudinal axis of the airplane, the adjacent edge portions of adjacent strips being flanged with said flanges extended inwardly to together form a strengthening and skin supporting internal rib along each seam, said skin strips being inwardly depressed at each side of each seam throughout its length, a uniting strip within said depression extending throughout the length of the strip and filling the depression with its outer surface flush with the outer surface of the skin and uniting said strips and extending across the seam, compression ribs each formed of a strip of sheet metal with its edge portion secured between the inturned edge flanges of the strips forming the skin and with its outer edge in abutting relation to the inner surface of said uniting strips, said inturned flanges of said skin strips and interposed compression rib being firmly united throughout the length of the seam, whereby said compression ribs are each firmly secured between the skin strips and said uniting strips firmly uniting the skin strips throughout the length of the seam or seams flush with the outer surface of the skin and holding said seams against opening up.

2. In an airplane, an airfoil including spaced apart spars, a skin formed of a plurality of strips extending transversely of said spars and formed with inwardly extending edge portions forming skin ribs, an external strip extending the full length of each seam and covering said seam and uniting adjacent strips forming the skin and members each forming a combined compression rib and drag brace and each formed from a strip of sheet metal bent longitudinally to provide a vertical portion secured at its upper edge within one of said skin ribs and to provide said vertical portion with a right angle portion at a distance inwardly from said rib and secured at its ends to said spars.

3. In an airplane, an airfoil including spaced apart spars, a skin formed of a plurality of sheet metal strips extending transversely of said spars with inwardly extended edge portions secured together to form seams uniting said strips and forming inwardly extending skin ribs, uniting strips secured to the exterior of said skin over said seams throughout the length of each seam, and L-shaped members each formed from a single sheet of metal and each secured at its ends to said spars and to said skin ribs adjacent one edge, with the laterally extending portion of each member spaced from the inner edge of the skin rib to which said member is secured.

4. In an airplane, an airfoil including spaced apart spars of box-like construction in cross section formed of a plurality of sheet metal strips with thin side walls reinforced by reinforcing strips extending over outer portions of the width of said side walls and having laterally projecting edge flanges, a skin, compression ribs formed of sheet metal to support said skin, and drag members formed of sheet metal connected to said ribs and at their ends to said flanges of said reinforcing strips of said spars.

5. In an airplane, an airfoil including a spar, formed of sheet metal providing a box-like construction in cross section with thin side walls and thick top and bottom walls formed of a plurality of strips laid one upon another, said strips being of varying lengths to decrease the thickness of each of said walls toward an end of the spar, said side walls being reinforced throughout a portion of their width only with reinforcing strips, a skin, and compression ribs connected to said reinforcing strips to support said skin.

6. In an airplane, an airfoil including spaced apart spars each formed of sheet metal strips providing a box-like construction with laminated top and bottom walls and with the single thickness side walls formed with a plurality of flanged openings to strengthen said side walls, and with reinforcing flanged strips, a skin, and means extending between and secured to said flanges of said reinforcing strips for supporting said skin and bracing said spars.

7. In an airplane, an airfoil including spaced apart spars each formed of sheet metal strips united to form a box-like construction in cross section with thin side walls provided with laterally extending flanges and with internal braces of X-form in cross section extending across between said walls and secured thereto, said braces being formed of strips of sheet metal, a sheet metal skin formed with integral skin ribs extending transversely of said spars, and combined compression ribs and drag members of L-form in cross section extending between said spars and secured at their ends to said flanges thereof, with said compression ribs secured to certain of said skin ribs.

JOSEPH R. SALZMAN.
CARL J. SNYDER.